United States Patent
Schmied et al.

(10) Patent No.: US 7,268,704 B2
(45) Date of Patent: Sep. 11, 2007

(54) INPUT DEVICE IN A VEHICLE AND METHOD OF OCCUPANT CLASSIFICATION

(75) Inventors: Martin Schmied, Neckarweihingen (DE); Frank Mack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 10/497,068

(22) PCT Filed: Sep. 20, 2002

(86) PCT No.: PCT/DE02/03549

§ 371 (c)(1),
(2), (4) Date: Oct. 12, 2004

(87) PCT Pub. No.: WO03/047915

PCT Pub. Date: Jun. 12, 2003

(65) Prior Publication Data
US 2005/0040938 A1 Feb. 24, 2005

(30) Foreign Application Priority Data
Nov. 30, 2001 (DE) ............................. 101 58 989

(51) Int. Cl.
*H03M 11/00* (2006.01)
(52) U.S. Cl. .................. 341/20; 280/735; 280/734; 180/271; 180/273
(58) Field of Classification Search .............. 341/20; 280/735, 734; 307/10.1; 180/271, 273
See application file for complete search history.

(56) References Cited

U.S. PATENT DOCUMENTS

| 5,482,314 | A | * | 1/1996 | Corrado et al. | ............. 280/735 |
| 6,007,094 | A | * | 12/1999 | Hosoda | ...................... 280/735 |
| 6,116,638 | A | * | 9/2000 | Hosoda | ...................... 280/735 |
| 6,312,013 | B1 | * | 11/2001 | Baur et al. | .................. 280/735 |
| RE37,466 | E | * | 12/2001 | Allen et al. | .................. 280/735 |
| 6,854,782 | B2 | * | 2/2005 | Reichert et al. | ......... 296/65.13 |

FOREIGN PATENT DOCUMENTS

| DE | 4 112 579 | 10/1991 |
| DE | 197 20 360 | 11/1998 |
| DE | 198 56 129 | 6/2000 |
| DE | 199 36 528 | 2/2001 |
| EP | 0 924 123 | 6/1999 |
| GB | 2 243 533 | 11/1991 |

\* cited by examiner

*Primary Examiner*—Albert K. Wong
(74) *Attorney, Agent, or Firm*—Kenyon & Kenyon LLP

(57) ABSTRACT

An input device in a vehicle and a method for occupant classification, in which an input regarding occupant classification is requested from the driver or some other user. This input is compared with an automatically produced occupant classification, and depending on this comparison a warning is issued, an occupant classification is communicated to the control unit for restraining devices, and/or a new input is requested.

6 Claims, 2 Drawing Sheets

INPUT DEVICE IN A VEHICLE AND METHOD OF OCCUPANT CLASSIFICATION

FIELD OF THE INVENTION

The present invention is directed to an input device in a vehicle and a method of occupant classification.

SUMMARY OF THE INVENTION

The input device in a vehicle according to the exemplary embodiment and/or exemplary method of the present invention for occupant classification may have the advantage that the automatic occupant classification is improved and optimized by an input from the user. This enables an object or an occupant on a particular vehicle seat to be better protected. It is designed to prevent erroneous classifications by the interior sensing system. The data entered by the driver is stored in the control unit. The possibility of inputting the information about the occupant classification is combined here with an occupant classification system.

If the interior sensing or occupant classification system recognizes that there is an object on the particular seat, for example via seat occupancy recognition by a seat mat, the driver is asked to input certain information. If this input is provided by the driver, the occupant classification system only checks the plausibility of the input, and may issue a warning that the input is not plausible. However, it is also possible for the driver's input to be used to check the plausibility of the occupant classification produced with the occupant classification system.

The exemplary input device according to the present invention is combinable with a control unit for restraining devices, to which the occupant classification is transmitted, so that adaptive activation of the restraining devices may be provided in the event of a crash.

Depending on the comparison of the entered occupant classification and the automatically determined occupant classification, another request for input may be issued, since an erroneous input has presumably been made. But if the input was recognized as plausible, a third occupant classification derived from the entered occupant classification and the automatically determined occupant classification is communicated to the control unit.

DETAILED DESCRIPTION

Figure 1:
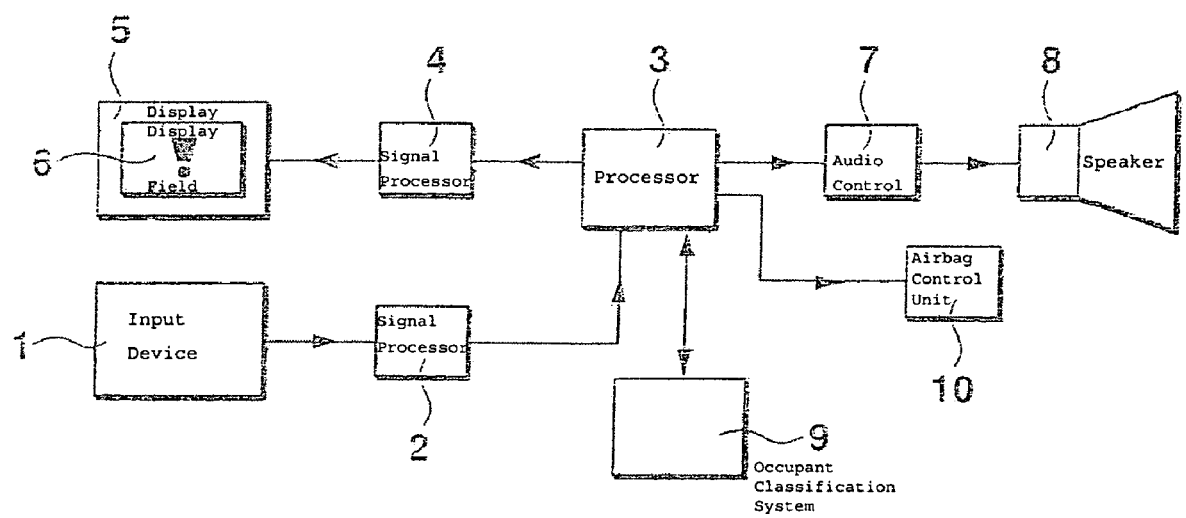
FIG. 1 shows a block diagram of the input device according to the present invention.

Increasingly there is intent to introduce an occupant classification system in vehicles, in order to enable adaptive activation of the restraining devices. This is intended to prevent unnecessary deployments, but also to reduce the risk of injury occurring from restraining devices such as airbags.

According to the exemplary embodiment and/or exemplary method of the present invention, the driver for example is now also asked to input information for occupant classification. This is intended in particular to prevent erroneous classifications by the interior sensing system. The user's input is simplified by appropriate supporting information. For example, a display shows what classes the user may enter.

One possibility is to define four classes. Class 1 covers a child seat and persons weighing up to 30 kg. The result of this is that an airbag is not deployed for this seat. Class 2 covers persons weighing 30-60 kg. Here a light airbag is deployed. Class 3 covers persons weighing 60-90 kg. Here a standard airbag is deployed. The fourth and last class covers persons over 90 kg. Here a powerful airbag is needed. The user will therefore specify one of the four classes, in order to classify the occupants on the individual seats. This has the advantage that it makes exact determination of the occupant possible, so that erroneous identifications are avoided.

The information that the driver must enter may also be made up of the information "Airbag on" or "Airbag off," but more detailed information about the exact weight class as indicated above is also possible. A comparison of the entered class and the class determined automatically using the occupant classification system makes it possible to check the plausibility of the input. If a user specifies Class 1 and the occupant classification system also detects Class 1, then plausibility exists and Class 1 is communicated to a control unit as the occupant classification. If a user specifies Class 1 but the occupant classification system detects Class 2, then plausibility does not exist; but Class 1 is communicated to the control unit, since Class 1 is the most sensitive class, i.e., the one that precludes deployment of an airbag. The same is also true if the occupant classification system detects Class 3 or 4.

However, if a user specifies Class 2 and the occupant classification system detects Class 1, then plausibility also does not exist; but in this case Class 2 is accepted and communicated to the control unit, since the user did not choose Class 1, i.e., the class that means "Airbag off." The same applies to the automatically detected Classes 2, 3 and 4.

However, if a user specifies Class 3 and the occupant classification system detects Class 1, then here too priority is given to the input and Class 3 is communicated. The same applies to all other classes detected by the occupant classification system. The case is exactly the same when Class 4 is entered. The classification "Airbag on" or "Airbag off" also gives priority to the input. A combination of the classifications "Airbag off" and "Airbag on" also gives priority to the input, Class 1 always being detected in the case of "Airbag off," and in the case of "Airbag on" at least Class 2 is detected, and otherwise the class detected by the automatic occupant classification system.

FIG. 1 shows a block diagram of the input device according to the present invention. An input device 1, which may have tactile input or acoustic input, is connected to a signal processor 2, which processes the inputs to input device 1. These processed signals from the input device are then communicated to a processor 3. Processor 3 is connected via a first data output to a signal processor 4, which drives a display 5 having a display field 6. Processor 3 is connected via a second data output to an audio control 7, which controls a speaker 8. Via a third data output processor 3 is connected to an airbag control unit 10, in order to communicate the detected occupant classification to control unit 10. Via a data input/output unit, processor 3 is connected to an occupant classification system 9, which has sensors in the individual seats or in the interior of the passenger compartment in order to detect the individual objects on the seats. Alternatively, the processor 3 may be integrated into airbag control unit 10.

Figure 2:
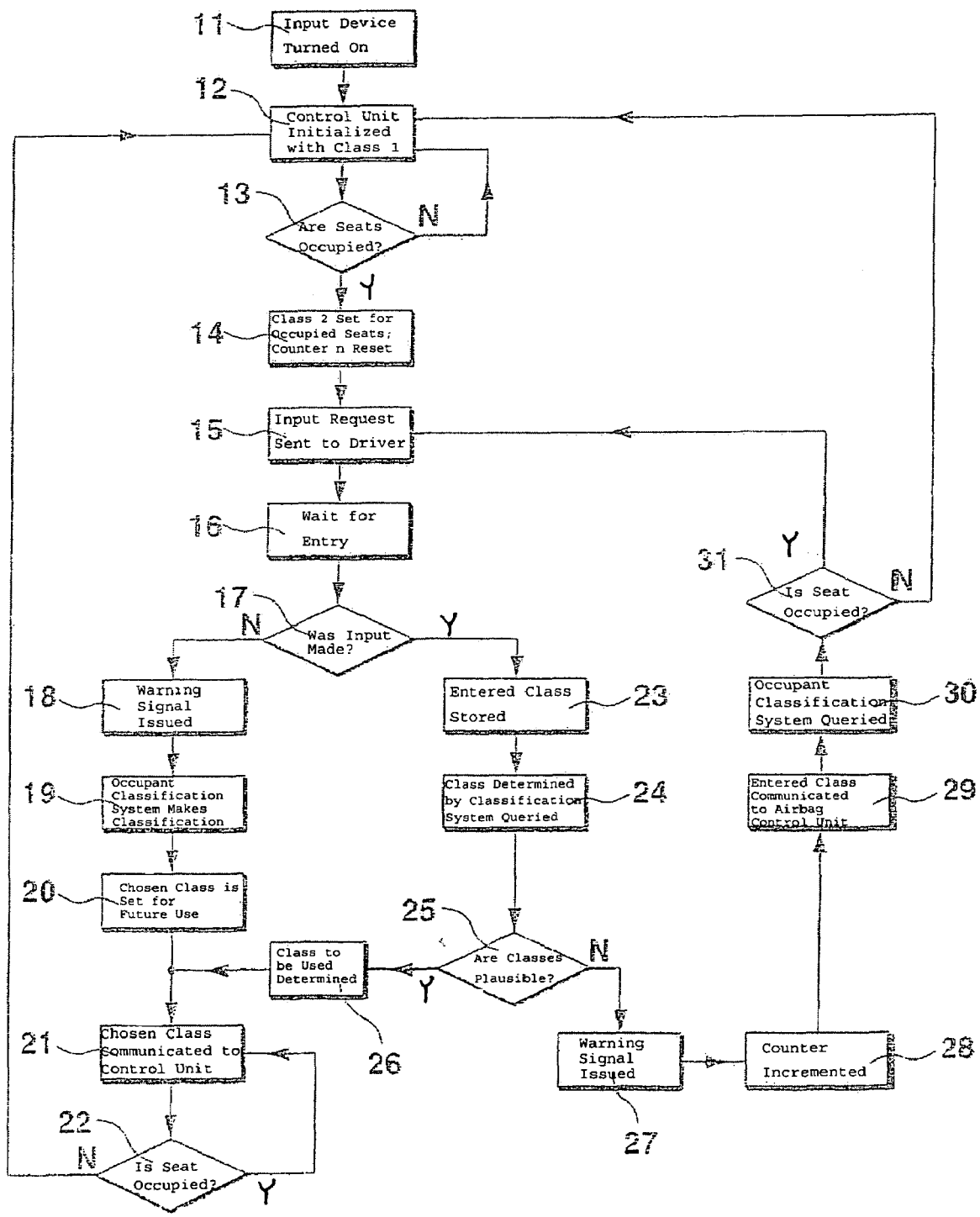
FIG. 2 shows a flow chart of the exemplary method for occupant classification according to the present invention.

The flow chart in FIG. 2 explains the exemplary method according to the present invention. In method step 11 the input device is turned on. In method step 12 control unit 10 is initialized with Class 1 for the individual seats, so that no airbag is activated. In method step 13 occupant classification system 9 is queried as to whether the individual seats are occupied. Processor 3 carries out this procedure according to the exemplary method of the present invention. If none of the seats is occupied, the procedure jumps back to method step 12. However, if it was determined in method step 13 that at least one of the seats is occupied, then in method step 14 Class 2 is assumed for the occupied seat, i.e., that the seat is occupied and will receive minimal protection. This is communicated to airbag control unit 10. A recursion counter n is reset to zero in method step 14.

In method step 15 an input request is sent to the driver. Display 5 and also speaker 8 are used for this purpose. In method step 16 there is a specified wait period to see whether the driver will make an entry. In method step 17 a check is then performed after this time period has elapsed to see whether the input was made. If this input was made, the procedure jumps ahead to method step 23. In method step 23 the entered class is stored. In method step 24 the class determined by the occupant classification system is queried. In method step 25 the comparison of the entered class and the class determined by occupant classification system 9 is performed. The result of the comparison is the plausibility, as explained above.

If plausibility was not detected, in method step 27 a warning signal is issued, for example using speaker 8. In method step 28 the recursion counter is incremented. In method step 29 the entered class is communicated to the airbag control unit. In method step 30 the occupant classification system is queried, and in method step 31 it is determined whether the particular seat is occupied. If the seat is occupied, the procedure jumps back to method step 15. If the seat is not occupied, the procedure jumps back to method step 12.

However, if it was determined in method step 17 that no input was made, then in method step 18 a warning signal is issued. In method step 19 the classification by occupant classification system 9 takes place. In method step 20 the class so determined is defined as the class to be used further. In method step 21 this class is communicated to control unit 10. In method step 22 a check is performed to determine whether the seat is occupied. If so, the procedure jumps back to method step 21; if not, it jumps to method step 12.

If it was determined in method step 25 that the entered class and the class determined by occupant classification system 9 are plausible, the procedure jumps to method step 26. The class to be transmitted to control unit 10 is decided from the entered class and the determined class, as described above. The procedure then jumps to method step 21, in order to communicate this determined class to airbag control unit 10.

What is claimed is:

1. An input device for a vehicle, comprising:
   an input arrangement connectable to at least one of a display and a speaker which requests an input regarding a first occupant classification for at least one seat, wherein the first occupant classification is inputted via the input arrangement by a user; and
   an occupant classification system connected to the input device, wherein the occupant classification based on a sensory input system automatically makes a second occupant classification and compares the first occupant classification with the second occupant classification, and wherein a warning signal is output if the first occupant classification is not consistent with the second occupant classification.

2. The input device of claim 1, wherein the input device is connectable to a control unit for a restraining device, to which one of: (i) the first occupant classification, (ii) the second occupant classification, and (iii) a third occupant classification derived from the first occupant classification and the second occupant classification, is transmitted.

3. A method for occupant classification, the method comprising:
   requesting a user to input an entry for a first occupant classification for the at least one seat;
   receiving an input from the user;
   automatically determining a second occupant classification with an occupant classification system based on sensory input;
   comparing the first occupant classification input with the automatically determined second occupant classification; and
   determining if the first occupant classification is consistent with the second occupant classification.

4. The method of claim 3, further comprising:
   issuing a warning depending on at least one of the input and the comparison.

5. The method of claim 3, wherein depending on the comparison, one of the following is performed: (i) issuing a new request for input; and (ii) transmitting a third occupant classification, which is derived from the first occupant classification and the second occupant classification, to a control unit.

6. The method of claim 5, further comprising:
   issuing a warning depending on at least one of the input and the comparison.

* * * * *